United States Patent
Shimizu

(10) Patent No.: US 9,009,276 B2
(45) Date of Patent: Apr. 14, 2015

(54) BROADCAST RECEIVER APPARATUS

(75) Inventor: Toshinori Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 13/123,248

(22) PCT Filed: Oct. 7, 2009

(86) PCT No.: PCT/JP2009/067462
§ 371 (c)(1),
(2), (4) Date: Apr. 8, 2011

(87) PCT Pub. No.: WO2010/041674
PCT Pub. Date: Apr. 15, 2010

(65) Prior Publication Data
US 2011/0202642 A1     Aug. 18, 2011

(30) Foreign Application Priority Data
Oct. 10, 2008 (JP) .................. 2008-263673

(51) Int. Cl.
G06F 15/177    (2006.01)
H04H 20/71     (2008.01)
H04N 7/173     (2011.01)
H04N 21/443    (2011.01)
H04N 21/61     (2011.01)

(52) U.S. Cl.
CPC ....... *H04N 7/17318* (2013.01); *H04N 21/4432* (2013.01); *H04N 21/4436* (2013.01); *H04N 21/6125* (2013.01)

(58) Field of Classification Search
None
See application file for complete search history.

(56) References Cited

U.S. PATENT DOCUMENTS 6,434,611 B1 *   8/2002   Wilson et al. ................. 709/221
8,041,831 B2 * 10/2011   Bertin ........................... 709/232
(Continued)

FOREIGN PATENT DOCUMENTS

EP    2 000 915 A2   12/2008
FR    2 864 869 A1    7/2005
(Continued)

*Primary Examiner* — Joshua Joo
*Assistant Examiner* — Younes Naji
(74) *Attorney, Agent, or Firm* — Birch, Stewart, Kolasch & Birch, LLP

(57) ABSTRACT

A broadcast receiver capable of receiving correct channel information anytime, even if a network to which the broadcast receiver is connected changes to another one, includes a storage unit and a controller. The storage unit stores a network configuration information file and channel information. The controller controls units of the broadcast receiver. Each time the broadcast receiver is activated, the controller connects to a network, acquires a network configuration information file from the connected network without simultaneously acquiring channel information therefrom, and determines whether network-identifying information described in the acquired network configuration information file is different from network-identifying information the network configuration information file stored in the storage unit. If the network names differ, the controller erases the stored channel information.

12 Claims, 6 Drawing Sheets

(56) References Cited

U.S. PATENT DOCUMENTS

| | | |
|---|---|---|
| 2004/0131076 A1* | 7/2004 | Smith .......................... 370/432 |
| 2006/0010437 A1 | 1/2006 | Marolia |
| 2006/0184964 A1* | 8/2006 | Kim et al. ...................... 725/39 |
| 2006/0250970 A1* | 11/2006 | Gao et al. ..................... 370/241 |
| 2007/0086459 A1 | 4/2007 | Hirota et al. |
| 2007/0118614 A1* | 5/2007 | Bertin .......................... 709/219 |
| 2007/0165634 A1 | 7/2007 | Park |
| 2008/0107068 A1* | 5/2008 | Kitahama et al. ............. 370/328 |
| 2008/0109861 A1* | 5/2008 | Xu et al. ...................... 725/105 |
| 2008/0155612 A1* | 6/2008 | Ikeda et al. ................... 725/87 |
| 2008/0216143 A1 | 9/2008 | Ikeda et al. |
| 2009/0034450 A1* | 2/2009 | Urner .......................... 370/328 |
| 2009/0300164 A1* | 12/2009 | Boggs et al. ................. 709/224 |

FOREIGN PATENT DOCUMENTS

| | | |
|---|---|---|
| JP | 2002-64769 A | 2/2002 |
| JP | 2007-329800 A | 12/2007 |
| JP | 2008-124857 A | 5/2008 |
| JP | 2008-153728 A | 7/2008 |
| JP | 2008-236736 A | 10/2008 |
| WO | WO 02/44827 A2 | 6/2002 |
| WO | WO 2007/040767 A1 | 4/2007 |
| WO | WO 2007/105460 A1 | 9/2007 |

* cited by examiner

FIG. 2

```
<cdn_main>
  <header>
    <cdn_serial>
      2008082600
    </cdn_serial>
  </header>
  <cdn_name>
    Network-A
  </cdn_name>
  <sntp>
    <sntp_server>
      ntp.server-a.net
    </sntp_server>
    <time_polarity>
      1
    </time_polarity>
    <time_delay>
      0900
    </time_delay>
  </sntp>
  <platform_list>
    <platform>
      <network_id>
        7777
      </network_id>
      <platform_name>
        Platform A
      </platform_name>
      <pf_url>
        http://www.platform-a.iptvf.jp/fdn-e/pf.comp
      </pf_url>
      <pf_serial>
        2008082600
      </pf_serial>
    </platform>
  </platform_list>
```

FIG. 3-1

```
<platform_main>
  <header>
    <pf_serial>
      2008082600
    </pf_serial>
  </header>
  <platform_name>
    Platform A
  </platform_name>
  <logo_url>
    http://tspstbvod1.provider-a.iptvf.jp/ipsp_stb/logo.new/logo2008040401.comp
  </logo_url>
  <drm_provider_id>
    0103
  </drm_provider_id>
  <ip_broadcast_service>
    <network_id>
      7780
    </network_id>
    <si_stream>
      <ip_protocol>
        1
      </ip_protocol>
      <channel_signaling>
        1
      </channel_signaling>
      <stream_port_number>
        30004
      </stream_port_number>
      <multicast_address>
        ff38::100
      </multicast_address>
      <source_address>
        2001:c90:6e00:ff2b::3:1
      </source_address>
    </si_stream>
  </ip_broadcast_service>
```

FIG. 3-2

```xml
<service_provider_list>
  <service_provider>
    <ip_service_provider_id>
      00
    </ip_service_provider_id>
    <service_provider_name>
      Provider A
    </service_provider_name>
    <ip_broadcaster_id>
      01
    </ip_broadcaster_id>
    <authority>
      provider-a.iptvf.jp
    </authority>
    <portal_url>
      http://tspstbvod1.provider-a.iptvh.jp/poweron/east_stb/
    </portal_url>
    <meta_url>
      http://tspstbvod1.provider-a.iptvh.jp/metaurl_stb
    </meta_url>
    <purchase_package_info_url>
      http://purchase.provider-a.iptvf.jp/HDPF/purchase/
    </purchase_package_info_url>
    <license_update_info_url>
      http://tspstbvod1.provider-a.iptvf.jp/cgi-bin/agent/agent.cgi?atesaki=mc_check_stb
    </license_update_info_url>
    <crl_url>
      http://tspstbvod1.provider-a.iptvf.jp/atk/iptvescrl.crl
    </crl_url>
  </service_provider>
</service_provider_list>
</platform_main>
```

BROADCAST RECEIVER APPARATUS

TECHNICAL FIELD

The present invention relates to a broadcast receiver apparatus and, more particularly, to a broadcast receiver apparatus capable of receiving an IP broadcast.

BACKGROUND ART

In recent years, broadcast receiver apparatuses have become capable of receiving various services by connecting to a network. One of the services is IP broadcasting. IP broadcasting is delivery of images and sounds over a dedicated IP network mainly using broadband. IP broadcasting provides a multichannel broadcasting service similar to those in terrestrial broadcasting and satellite broadcasting, a video on demand service, and the like.

Under the present circumstances where the diversity of services and the number of service providers are increasing, content which can be viewed through a broadcast receiver apparatus differs widely depending on how a user signs up with a service provider. However, a user has difficulty in grasping which content can be viewed.

In the case of IP broadcasting, a broadcast receiver apparatus needs to acquire a CDN configuration information file of a CDN (Contents Delivery Network) to which the broadcast receiver apparatus is connected, acquire a PF (platform) configuration information file described in the CDN configuration information file, connect to a multicast address described in the PF configuration information file, and perform a channel search by acquiring all pieces of channel information in a PF from an SI (Service Information)-dedicated stream when the broadcast receiver apparatus is activated for the first time.

Patent Document 1 discloses an update information generating device. If an encryption key used for encryption processing when a service is used last time is older than a current encryption key, the update information generating device performs encryption processing by using both the current encryption key and the old encryption key to generate two pieces of service use identification information and transmits the two generated pieces of service use identification information to a service providing server to instruct the service providing server to overwrite the older piece of service use identification information with the newer piece of service use identification information. With this operation, the update information generating device can accurately specify a user having an updated ID even when an encryption key is updated during ID generation by encryption processing.

Patent Document 1: JP Patent Publication (Kokai) No. 2008-153728 A

DISCLOSURE OF THE INVENTION

Problems to be Solved by the Invention

For example, if a CDN to which a conventional broadcast receiver apparatus is connected changes to another one due to a move or a switch from one CDN provider to another one, channels which can be received by the broadcast receiver apparatus change, and the broadcast receiver apparatus needs to perform a new channel search. If a channel search is not performed after the change of the connection destination CDN, the broadcast receiver apparatus refers to channel information acquired from the CDN configuration information file of a CDN which is the former connection destination. The broadcast receiver apparatus may malfunction or may become unable to receive a desired channel.

The conventional technique of Patent Document 1 requires updated information and old information to be paired with each other. This may cause problems such as an increase in storage capacity needed and an increase in time consumption.

The present invention has been made in consideration of the above-described circumstances, and has its object to provide a broadcast receiver apparatus capable of acquiring correct channel information any time even if a network to which the broadcast receiver apparatus is connected changes to another one.

Means for Solving the Problems

A broadcast receiver apparatus according to the present invention acquires a network configuration information file each time the broadcast receiver apparatus is activated. If a piece of information for identifying a network described in the network configuration information file is different from a piece of information for identifying a network described in a formerly acquired network configuration information file, the broadcast receiver apparatus determines that a connection destination network has changed and initializes channel information.

If channel information is present in a new network, the broadcast receiver apparatus performs a new channel search. With this configuration, if a network to which a broadcast receiver apparatus is connected changes to another one, a user is saved from having to perform a new channel search, and a problem caused by reference to old channel information can be prevented.

A broadcast receiver apparatus according to the present invention is a broadcast receiver apparatus which can receive an IP broadcast, including storage means for storing a network configuration information file and channel information and control means for controlling units of the broadcast receiver apparatus, wherein when the broadcast receiver apparatus is activated, the control means connects to a network, acquires a network configuration information file, determines whether a piece of information for identifying a network described in the acquired network configuration information file is different from a piece of information for identifying a network described in the network configuration information file stored in the storage means, and initializes the channel information if the pieces of information are different.

If there is channel information, the channel information may be acquired on the basis of a piece of information described in the network configuration information file, and the network configuration information file and channel information stored in the storage means may be overwritten with the newly acquired network configuration information file and channel information.

The pieces of information for identifying the networks may each be a network name.

The control means may acquire a platform configuration information file on the basis of a piece of information described in the network configuration information file and acquire the channel information on the basis of a piece of information described in the platform configuration information file.

The control means may acquire a plurality of platform configuration information files on the basis of the piece of information described in the network configuration information file and acquire the channel information on the basis of respective pieces of information described in the plurality of platform configuration information files.

A method for updating channel information in a broadcast receiver apparatus which can receive an IP broadcast according to the present invention includes a step of connecting to a network when the broadcast receiver apparatus is activated, a step of acquiring a network configuration information file, a step of comparing a piece of information for identifying a network described in the newly acquired network configuration information file with a piece of information for identifying a network described in the network configuration information file which is formerly acquired and is stored, a step of initializing the channel information if names of the two networks are different, and a step of determining on the basis of a piece of information described in the newly acquired network configuration information file whether there is channel information and a step of acquiring channel information if there is any channel information, and a step of overwriting the stored network configuration information file and channel information with the newly acquired network configuration information file and channel information.

The present invention may be a program for causing a computer to perform the above-described method. Alternatively, the present invention may be a computer-readable recording medium having the program recorded thereon. The program may be acquired via a transmission medium such as the Internet.

Advantage of the Invention

According to the present invention, it is possible to acquire correct channel information any time even if a network serving as a connection destination changes to another one.

BRIEF DESCRIPTION OF THE DRAWINGS

FIG. 2 is a view showing an example of a CDN configuration information (XML) file.

FIG. 3 are views showing an example of a PF configuration information file.

DESCRIPTION OF SYMBOLS

Figure 1:
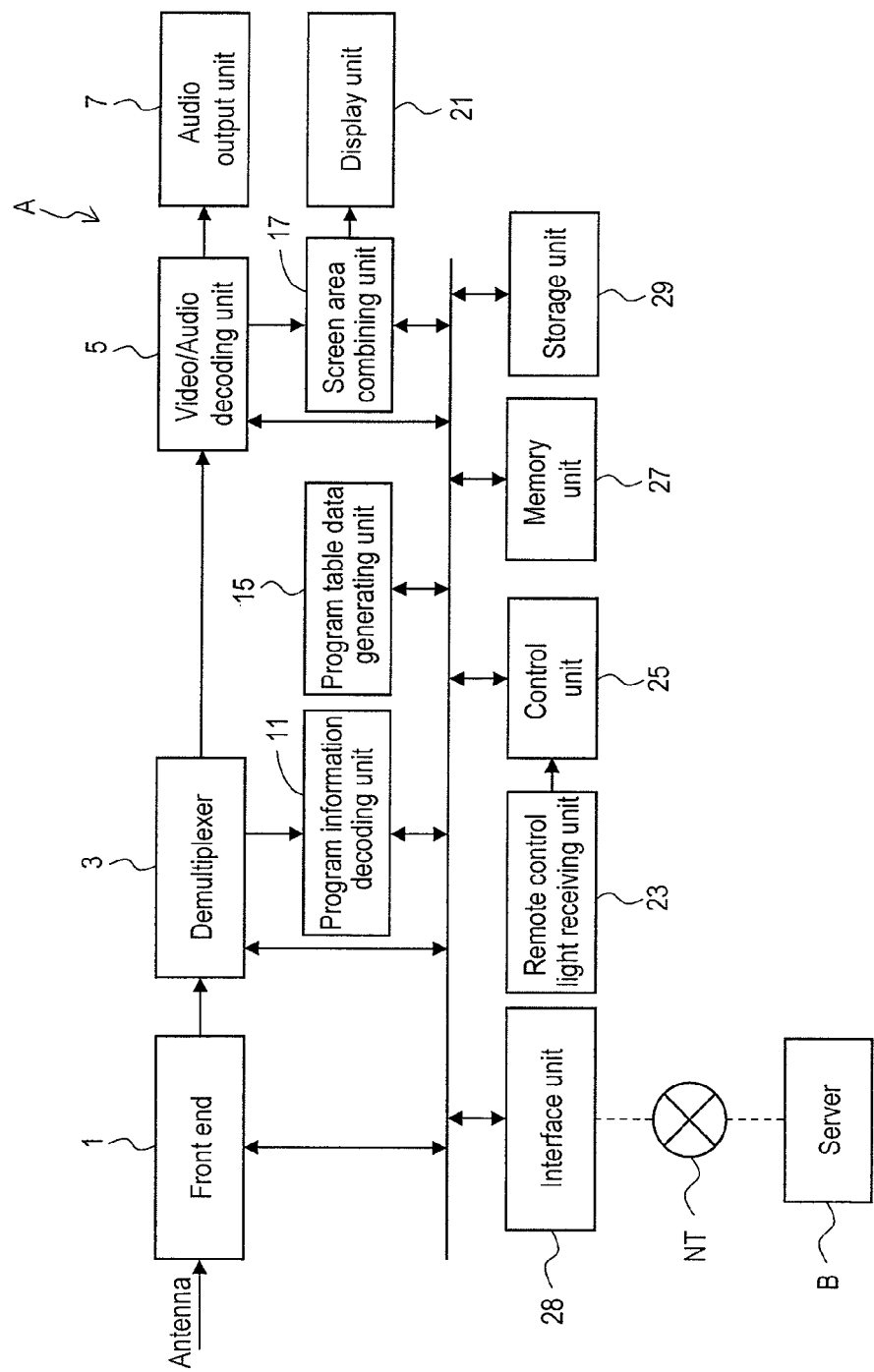
FIG. 1 is a block diagram showing an example of the configuration of a broadcast receiver apparatus according to the present invention.

A digital broadcast receiver apparatus
1 front end
3 demultiplexer
5 video/audio decoding unit
7 audio output unit
11 program information decoding unit
17 screen area combining unit
21 display unit
25 control unit
28 interface unit
29 storage unit
NT Internet
B content server

BEST MODE FOR CARRYING OUT THE INVENTION

FIG. 1 is a block diagram showing an example of the configuration of a broadcast receiver apparatus according to the present invention. A digital broadcast receiver apparatus A shown in FIG. 1 includes a front end 1 which receives signals of a digital broadcast from an antenna and performs channel selection and the like, a demultiplexer 3, a video/audio decoding unit 5 which decodes an output from the demultiplexer 3, a screen area combining unit 17 which generates signals for displaying a composite of decoded video signals and program table data (to be described later), a display unit 21 which is based on signals generated by the screen area combining unit 17, and an audio output unit 7 which outputs sounds.

The broadcast receiver apparatus also includes a program information decoding unit 11 which decodes program information outputted from the demultiplexer 3 and an electronic program table generating unit 15 which generates an electronic program table on the basis of the program information decoded by the program information decoding unit 11.

The broadcast receiver apparatus further includes an interface unit 28 which forms an interface with another external device, a remote control light receiving unit 23 which receives a remote control signal from a remote control device serving as a control device, a control unit (CPU) 25 which controls the entire apparatus, a memory unit (RAM and ROM) 27 on which an application program for various processes to be executed by the control unit 25 is recorded and which expands the program and supplies the expanded program to the CPU, and a storage unit which stores a CDN configuration information file and channel information (to be described later). The interface unit 28 can receive digital content delivered from a content server B over a CDN (to be described later). The control unit 25 also performs control associated with channel selection when IPTV is selected.

A broadcast receiver apparatus according to the present invention receives digital content delivered from a content server over a CDN (Contents Delivery Network) that is a network designed to deliver digital content. CDN providers for IP broadcasting with which users of broadcast receiver apparatuses sign up each use a fixed CDN. Some CDN providers use a plurality of CDNs for respective areas such as eastern Japan and western Japan. A broadcast receiver apparatus acquires the CDN configuration information file of a CDN to which the broadcast receiver apparatus is connected in order to acquire information on services to be provided. A CDN configuration information file is generally described in XML. Whichever CDN a broadcast receiver apparatus is connected to, a URL for acquiring a CDN configuration information file is the same (http://cdn.iptvf.jp/cdn.comp). A returned IP address is operated to change depending on the CDN by a DNS (Domain Name System) to which a broadcast receiver apparatus connects. The contents of a CDN configuration information file vary from CDN to CDN.

FIG. 2 is a view showing an example of a CDN configuration information file. A CDN to which a broadcast receiver is currently connected can be identified by a character string ("Network-A" in this example) between the <cdn_name> tag and the </cdn_name> tag. A character string ("http://www.platform-a.iptvf.jp/fdn-e/pf.comp" in this example) between the <pf_url> tag and the </pf_url> tag is an URL for acquiring a PF (platform) configuration information file (to be described later).

FIG. 3 are views showing an example of a PF configuration information file. A PF configuration information file is generally described in XML, like a CDN configuration information file. In a PF configuration information file, SI (Service Information)-dedicated stream information is described in a part between the tag <si_stream> and the tag </si_stream>. In this SI-dedicated stream information, a character string ("ff38::100" in this example) between the tag <multicast_address> and the tag </multicast_address> is a multicast address. A broadcast receiver apparatus can connect to such a multicast address at the time of a channel search and acquire all pieces of channel information in a PF from an SI-dedicated stream. Accordingly, an IP broadcast can be viewed with a broadcast receiver apparatus.

In the PF configuration information file, the URL of a portal is described in a part between the <portal_url> tag and the </portal_url> tag. A VOD (video on demand) service can be received by connecting to the URL.

An IP broadcast service, a VOD service, or both of the services can be received from a CDN, depending on the service form of the CDN provider.

Figure 4:
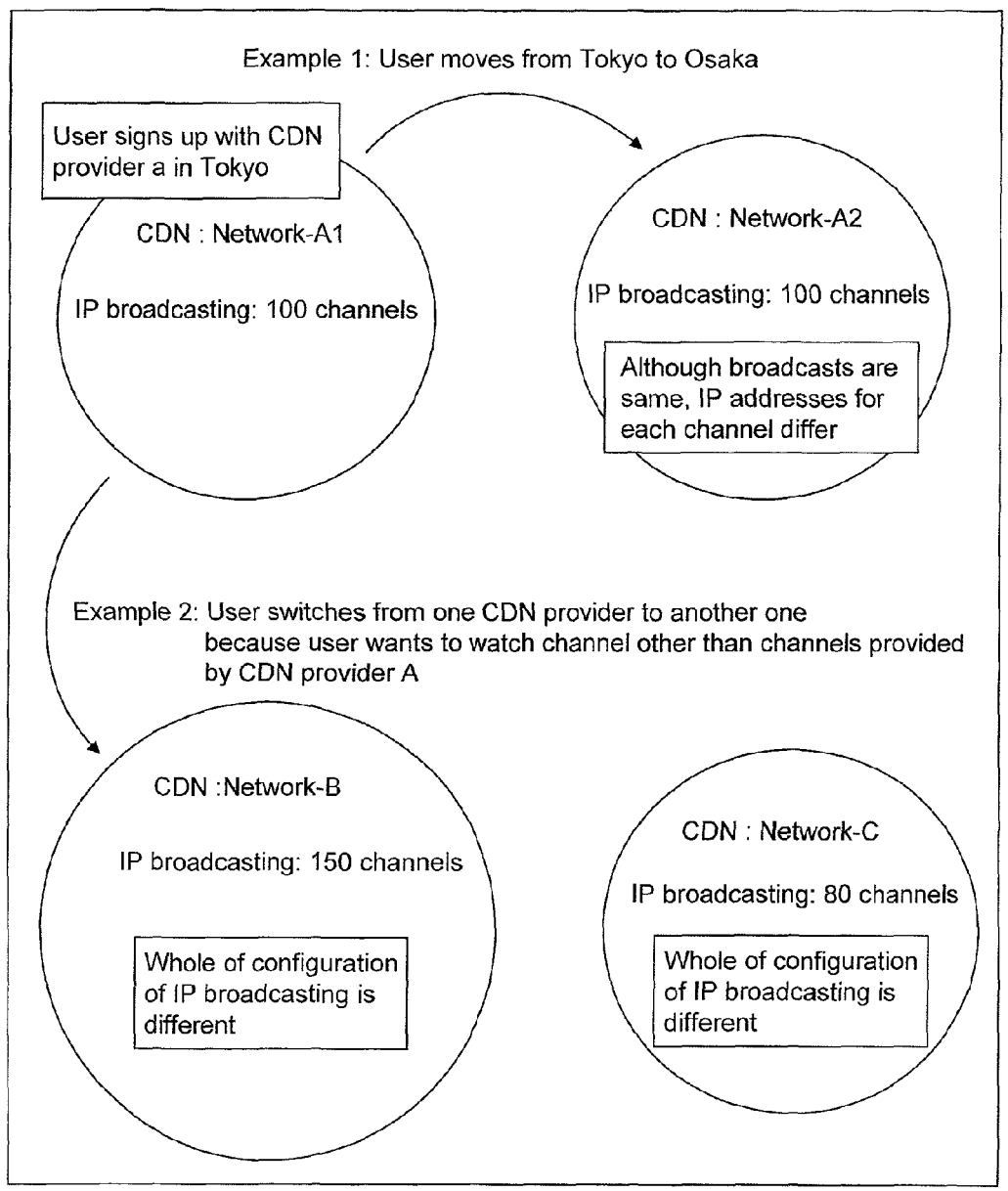
FIG. 4 is a diagram for explaining a change of a CDM to which a broadcast receiver apparatus is connected.

FIG. 4 is a diagram for explaining a change of a CDN to which a broadcast receiver apparatus is connected. First, assume that a user has a contract with CDN provider A that is a CDN provider which provides an IP broadcast service in Tokyo. CDN provider A provides the service by using different CDNs for areas. Broadcast receiver apparatuses of users in Tokyo are connected to a CDN named Network-A1.

Assume a case where the user moves from Tokyo to Osaka, as example 1. The user has a contract with CDN provider A, the same CDN provider as when the user was in Tokyo. However, CDN provider A provides the service in Osaka by using a CDN (Network-A2) different from the CDN (Network-A1) used in Tokyo. Accordingly, the broadcast receiver apparatus of the user having moved to Osaka is connected to Network-A2. The service provided by CDN provider A is an IP broadcast service on 100 channels both in Network-A1 and in Network-A2. Although broadcasts in Network-A1 and ones in Network-A2 are the same, IP addresses for each channel differ between Network-A1 and Network-A2. In this case, it is necessary to perform a new channel search and acquire information on channels available in Network-A2.

Assume a case where the user switches from CDN provider A to another CDN provider, CDN provider B, as example 2. CDN provider B provides services by using a CDN named Network-B. CDN provider A and CDN provider B are different in the overall configuration of IP broadcasting. In some cases, CDN provider B may not provide an IP broadcast service and may provide only a VOD service. Accordingly, if CDN provider B provides an IP broadcast service, it is necessary to perform a new channel search and acquire information on channels available in Network-B provided by CDN provider B.

Figure 5:
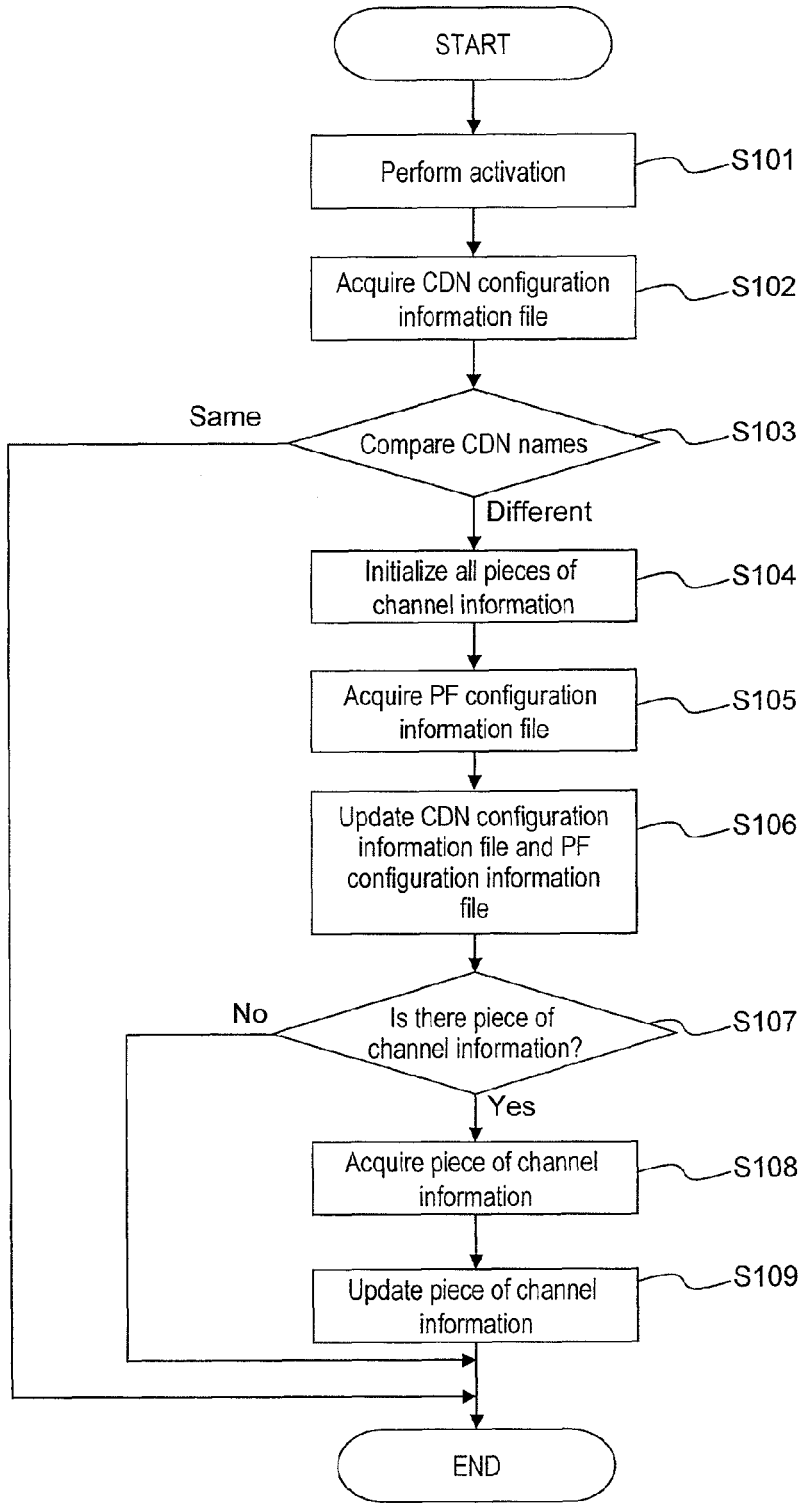
FIG. 5 is a flow chart for explaining the procedure for a channel search when a broadcast receiver apparatus according to the present invention is activated.

FIG. 5 is a flow chart for explaining the procedure for a channel search when a broadcast receiver apparatus according to the present invention is activated. In step S101, the broadcast receiver apparatus is powered on and is activated. In step S102, the broadcast receiver apparatus connects to a CDN, accesses the URL http://cdn.iptvf.jp/cdn.comp, and acquires a CDN configuration information file. In step S103, the broadcast receiver apparatus determines whether a CDN name (a character string between the tag <cdn_name> and the tag </cdn_name>) described in the newly acquired CDN configuration information file is equal to a CDN name described in a CDN configuration information file formerly acquired and stored in its storage unit. If the CDN names are equal, the broadcast receiver apparatus determines that a connection destination CDN remains unchanged, the process ends. On the other hand, if the CDN names are different, the broadcast receiver apparatus determines that the connection destination CDN has changed, and the flow advances to step S104.

In step S104, the broadcast receiver apparatus determines that the connection destination CDN has changed and that the broadcast receiver apparatus is connected to a new network and erases all of formerly acquired pieces of channel information stored in the storage unit.

In step S105, the broadcast receiver apparatus acquires a PF configuration information file by using the URL (a character string between the <pf_url> tag and the </pf_url> tag) of the PF configuration information file described in the newly acquired CDN configuration information file.

In step S106, the broadcast receiver apparatus erases the CDN configuration information file and a PF configuration information file stored in the storage unit of a CDN which is the former connection destination and updates the CDN configuration information file newly acquired in step S102 and the PF configuration information file newly acquired in step S105.

In step S107, the broadcast receiver apparatus checks the presence or absence of a multicast address (a character string between the <multicast_address> tag and the </multicast_address> tag) described in the PF information file. If the tags themselves are not present or there is no multicast address, the broadcast receiver apparatus determines that there is no piece of channel information and ends the process. On the other hand, if there is any piece of channel information, the flow advances to step S108.

In step S108, the broadcast receiver apparatus connects to a multicast address and acquires all pieces of channel information in a PF from an SI-dedicated stream. At this time, reception of the SI-dedicated stream is performed with RTP (Real-time Transport Protocol) (UDP (User Datagram Protocol)), and pieces of NIT (Network Information Table) data for all channels are acquired and regarded as the pieces of channel information. The broadcast receiver apparatus updates the newly acquired pieces of channel information and ends the process.

Note that if the CDN to which the broadcast receiver apparatus is connected includes a plurality of PFs, the broadcast receiver apparatus acquires a plurality of PF configuration information files in step S105. After updating of files in step S106, the broadcast receiver apparatus performs the processes in step S107 to S109 for each PF.

As has been described above, a broadcast receiver apparatus according to the present invention acquires a CDN configuration information file each time the broadcast receiver apparatus is activated. The broadcast receiver apparatus compares a CDN name described in the newly acquired CDN configuration information file with a CDN name described in a formerly acquired and stored CDN configuration information file. If the CDN names are different, the broadcast receiver apparatus determines that a connection destination CDN has changed, erases all pieces of channel information, acquires a PF configuration information file on the basis of information described in the newly acquired CDN configuration information file, connects to a multicast address described in the PF configuration information file to acquire pieces of channel information, and overwrites a CDN configuration information file and pieces of channel information stored in its storage unit with the new CDN configuration information file and the new pieces of channel information.

With this configuration, if a CDN to which a broadcast receiver apparatus is to be connected changes to another one due to a move, a switch from one CDN provider to another one, or the like of a user, the user need not intentionally perform a channel search and can automatically acquire respective pieces of channel information of channels provided by a CDN to which the broadcast receiver apparatus is currently connected. Additionally, the configuration makes it possible to prevent problems such as a malfunction in a broadcast receiver apparatus caused by a situation in which a new channel search is not performed in spite of a change of a connection destination CDN and the broadcast receiver apparatus refers to pieces of channel information acquired based on a CDN configuration information file of a CDN different from a CDN to which the broadcast receiver apparatus is currently connected.

INDUSTRIAL APPLICABILITY

The present invention is applicable to a broadcast receiver apparatus.

The invention claimed is:

1. A broadcast receiver apparatus configured to receive an IP broadcast, the broadcast receiver comprising:
 a memory configured to store a network configuration information file and channel information for a previously-connected content delivery network; and
 a controller configured to control units of the broadcast receiver apparatus, wherein each time the broadcast receiver apparatus is activated, responsive to the broadcast receiver apparatus being activated, the controller:
  connects to a content delivery network,
  acquires from the connected content delivery network a network configuration information file without simultaneously acquiring channel information,
  performs a comparison of a piece of information identifying a content delivery network which is described in the acquired network configuration information file with a different piece of identifying information which is described in a formerly-acquired content delivery network configuration information file,
  determines whether a currently connected content delivery network is different from the previously-connected content delivery network based on the comparison, and
  initializes, by erasing from the memory, the stored channel information, which is all channel information associated with the previously connected content delivery network, in a case that the previously-connected content delivery network is different from the currently connected content delivery network.

2. The broadcast receiver apparatus according to claim 1, wherein if there is channel information available from the currently-connected content delivery network, the controller also acquires the available channel information on the basis of the piece of information described in the acquired network configuration information file and overwrites the network configuration information file and channel information stored in the memory with the newly acquired network configuration information file and channel information.

3. The broadcast receiver apparatus according to claim 1, wherein the pieces of information for identifying the networks are each a network name.

4. The broadcast receiver apparatus according to claim 2, wherein the controller acquires a platform configuration information file on the basis of a piece of information described in the network configuration information file and acquires the channel information on the basis of a piece of information described in the platform configuration information file.

5. The broadcast receiver apparatus according to claim 2, wherein the controller acquires a plurality of platform configuration information files on the basis of the piece of information described in the network configuration information file and acquires the channel information on the basis of respective pieces of information described in the plurality of platform configuration information files.

6. The broadcast receiver apparatus according to claim 2, wherein the pieces of information for identifying the networks are each a network name.

7. The broadcast receiver apparatus according to claim 3, wherein the controller acquires a platform configuration information file on the basis of a piece of information described in the network configuration information file and acquires the channel information on the basis of a piece of information described in the platform configuration information file.

8. The broadcast receiver apparatus according to claim 3, wherein the controller acquires a plurality of platform configuration information files on the basis of the piece of information described in the network configuration information file and acquires the channel information on the basis of respective pieces of information described in the plurality of platform configuration information files.

9. The broadcast receiver apparatus according to claim 1, wherein
 in a case that the acquired network configuration information file includes information that describes a platform configuration information file, the controller acquires the platform configuration information file from the network, overwrites the network configuration information file stored in the memory with the newly acquired network confirmation information file, and overwrites a previously-stored platform configuration information file stored in the memory with the newly acquired platform configuration information file, and
 in a case that the newly acquired platform configuration information file includes information to acquire the channel information, the controller acquires the channel information from the network, and writes the channel information acquired from the network in the place of the erased channel information.

10. The broadcast receiver apparatus according to claim 2, wherein
 in a case that the acquired network configuration file includes a plurality of information for acquiring platform configuration information files, the controller acquires from the connected network the corresponding plurality of platform configuration information files, and for each platform configuration information file that includes an information for acquiring channel information, the controller acquires the corresponding channel information.

11. A method for updating channel information in a broadcast receiver apparatus which can receive an IP broadcast, the method comprising:
 connecting to a content delivery network each time the broadcast receiver apparatus is activated;
 acquiring from the connected content delivery network a network configuration information file without simultaneously acquiring channel information;
 performing a comparison of a piece of information, for identifying a content delivery network, described in the newly acquired network configuration information file with a piece of information, for identifying a content delivery network, described in the network configuration information file which is formerly acquired and is stored;
 determining whether a currently-connected content delivery network is different from a previously-connected content delivery network based on the comparison;

initializing, by erasing, previously stored channel information, which is all channel information associated with the previously connected content delivery network, if the currently connected content delivery network is different from the previously-connected content delivery network; and determining on the basis of a piece of information described in the newly acquired network configuration information file whether there is channel information available from the currently connected content delivery network and acquiring the channel information from the currently connected content delivery network if there is any channel information; and overwriting the stored network configuration information file and initialized channel information with the newly acquired network configuration information file and channel information.

12. A non-transitory computer-readable recording medium having recorded thereon instructions which when executed by a computer cause the computer to perform the method according to claim 11.

* * * * *